Patented Feb. 25, 1941

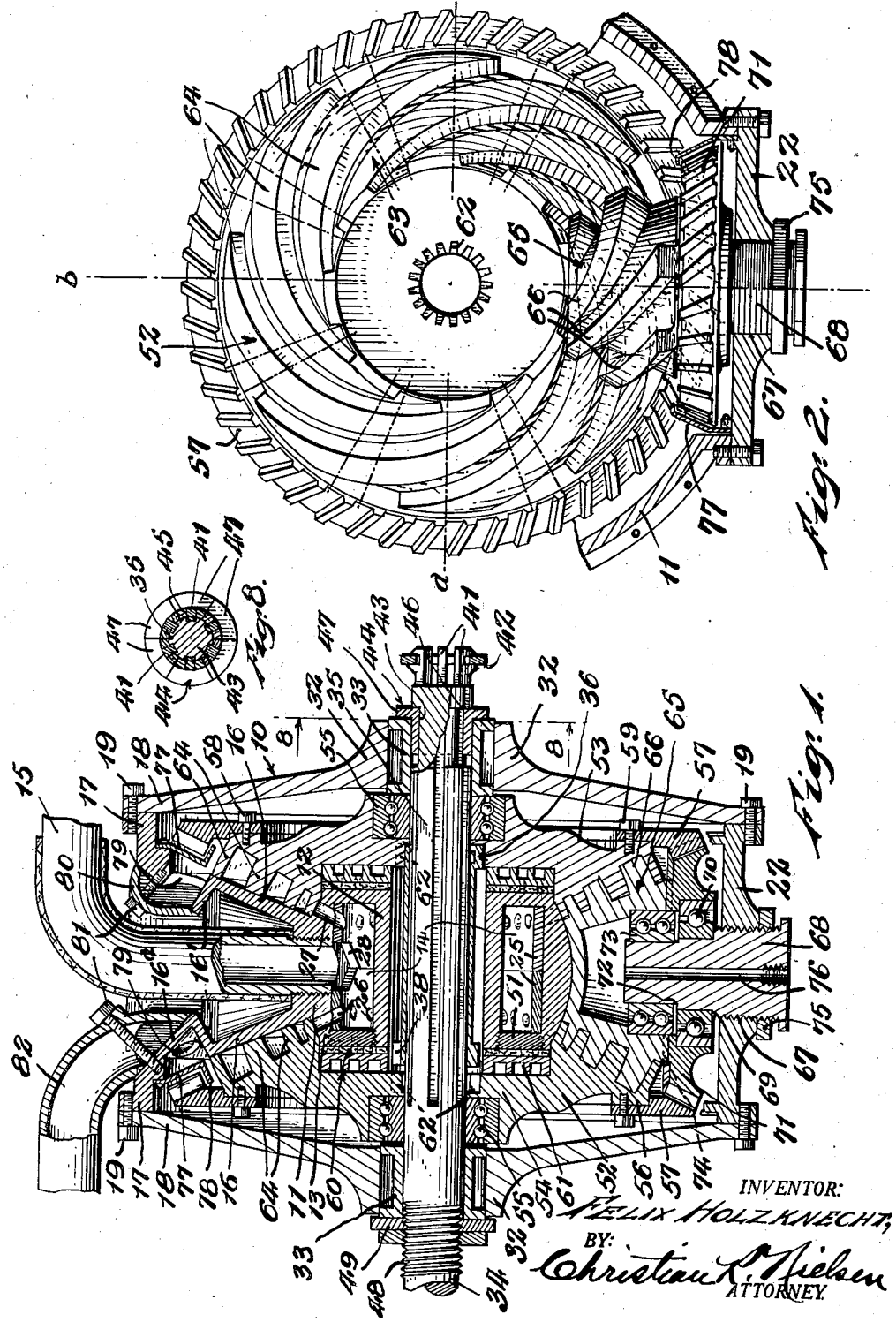

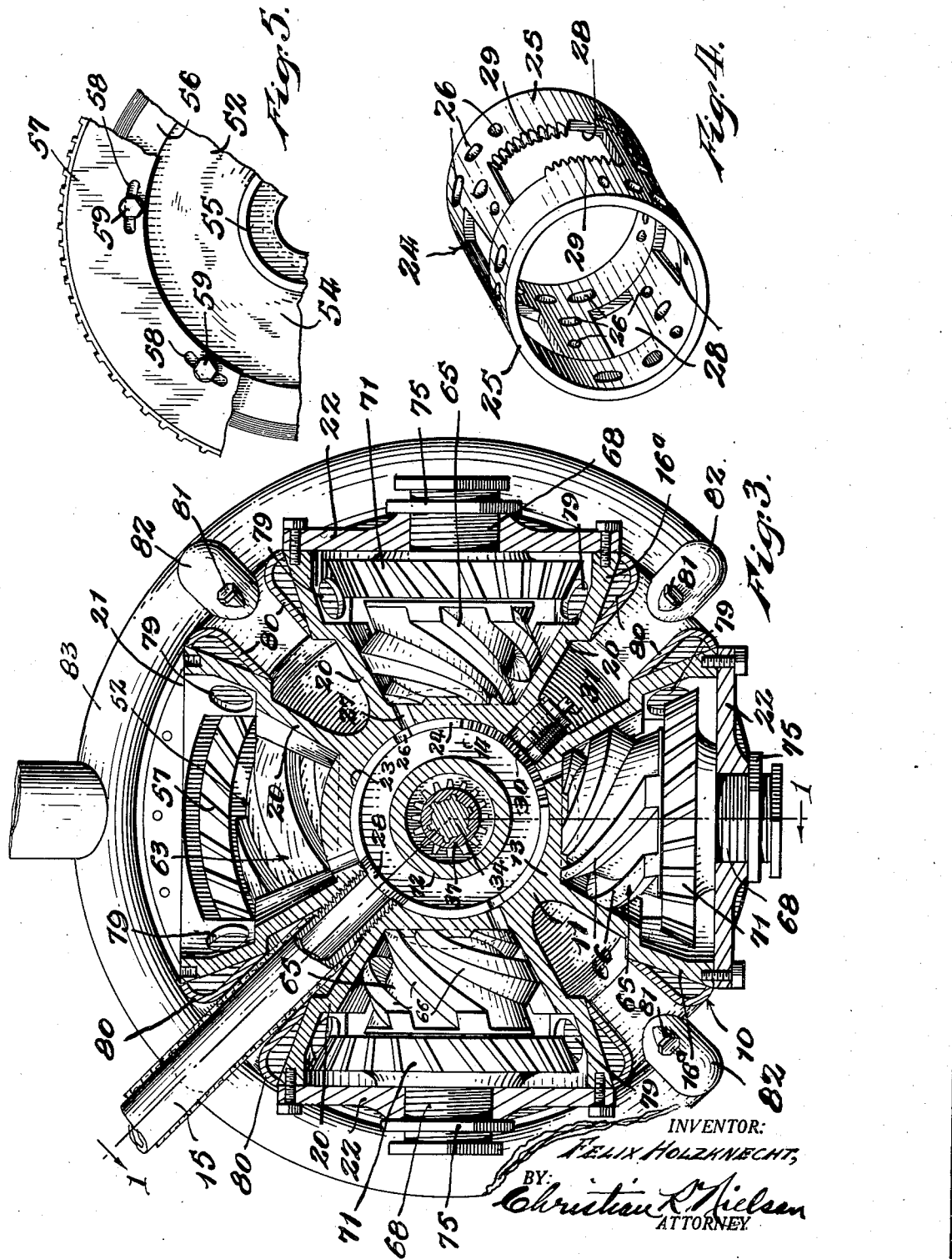

2,232,702

UNITED STATES PATENT OFFICE 2,232,702

ROTARY STEAM ENGINE

Felix Holzknecht, Vancouver, British Columbia, Canada

Application March 21, 1939, Serial No. 263,245

14 Claims. (Cl. 121—70)

This invention relates to steam engines of the rotary type and it consists in the constructions, arrangements and combinations herein described and claimed.

It is an object of the invention to provide an engine in which an even and continuous torque is developed when in operation, thereby providing an engine which is smooth in action.

It is a still further object of the invention to provide an engine in which a pair of ribbed rotary members are interconnected with a suitable number of worm pinions, the worm threads of the pinions intermeshing with the ribs of the rotary members in such manner that steam admitted between the worms and ribs effects rotation of the rotary members.

It is a still further object of the invention to provide a novel drive for synchronizing rotation of the rotary members and the worm pinions, as well as providing means for adjusting the drive means to compensate for wear or other adjustment.

It is also an object of the invention to provide axial adjusting means for the rotary members and the worm pinions thereby permitting adjustment of the members to proper fitting engagement during assembly or to compensate for wear between the parts.

It is a still further object of the invention to provide a steam engine which may be readily reversed as to the direction of rotation.

It is also an object of the invention to provide a steam engine having a center steam intake and a continuously open exhaust permitting unobstructed escape of exhaust steam, in a silent manner.

It is also among the objects of the invention to provide a construction of steam engine in which the drive means between the rotary members and the worm pinions may be properly lubricated without liability of the lubricant coming in contact with live steam.

Additional objects, advantages and features of invention will be apparent from the following description considered in conjunction with the accompanying drawings, wherein Figure 1 is a section through an engine constructed in accordance with my invention, approximately on the lines 1—1 of Figure 3.

Figure 2 is an elevation of one of the rotary members, the casing being shown in part, and illustrating one of the worm pinions in operative position with the rotary member.

Figure 3 is a vertical cross section at right angles to Figure 1, with one of the worm pinions removed.

Figure 4 is a perspective of the valve for controlling admission of steam from the steam chest.

Figure 5 is a fragmentary detail of a drive pinion for effecting the drive between the rotary members and worm pinions.

Figure 8 is a cross section on the line 8—8 of Figure 1.

Figure 7:
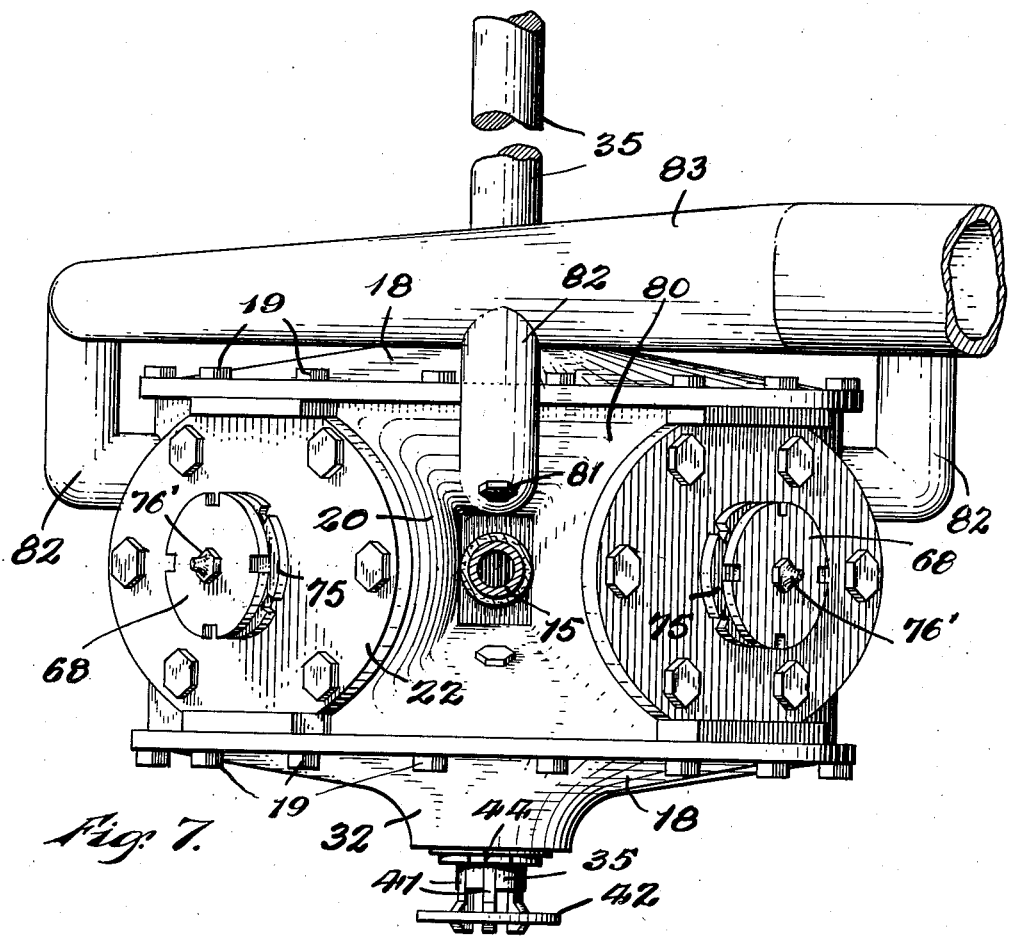
Figure 7 is a sectional view of the engine, taken on a plane perpendicular to the axis of the steam intake pipe.

There is illustrated an engine generally indicated at 10 having a body portion 11 provided with a hollow axial hub 12 spaced inwardly of an outer hub portion 13, defining a steam chest 14. The outer hub 13 is drilled and tapped to receive a steam pipe 15, the latter opening upon the chest 14 for discharge of steam thereinto.

The outer hub 13 is provided with a pair of outwardly and oppositely diverging walls 16, each of which terminate in an annular flange 17, affording securement of respective end closure plates 18, by means of threaded bolts 19.

At diametrically opposite sides and positioned in the vertical and horizontal axis of the engine, the walls 16 are formed contiguously circumferentially to define substantially conical housings 20. The outer edges of the walls are planiform as indicated at 21 for suitably mounting closure plates 22, (see Fig. 3).

The hub 13 forming the inner apex of each housing is preferably semi-spherical providing a bearing support for the inner end of respective worm pinions, as will be described hereinafter.

The steam chest 14 has an annular inner wall 23 forming a bearing surface for an annular steam control valve 24, the latter comprising a pair of annular sleeve members 25, each of which is provided with ports 26 for control of steam through ports 27 forming communication with the housings 20. The sleeves 25 are arranged in end to end abutting relation cut-away as at 28, to form communication with the steam inlet pipe 15. The sleeves 25 are also provided with gear teeth 29, the teeth of one sleeve being arranged in opposed relation to the teeth of the other sleeve, and operatively arranged with the teeth a gear 30 is provided. As shown in Figure 3, the gear 30 is rotatably journalled in the hub 13 and includes an external shaft portion 31 whereby the gear may be rotated to effect shifting movements of the sleeves 25 and thus affording regulation of steam passing into the housings 20 from the chest 14.

Each of the closure plates 18 is provided with an axial hub 32 in each of which there is a collar 33 supporting a shaft 34. The collars 33 are supported in roller bearings and the shaft 34 is revoluble therewith, but the shaft is maintained against longitudinal movement normally, by means presently to be described.

The shaft 34 has a plurality of longitudinally extended splines 41, the latter receiving a reverse gear means 36, consisting of a sleeve 37 having longitudinal slots complemental to the splines of the shaft, and an integrally formed spur gear 38 at respective ends, the latter being movable into meshed relation with a gear of a rotary driven member, as will be explained.

Figure 6:
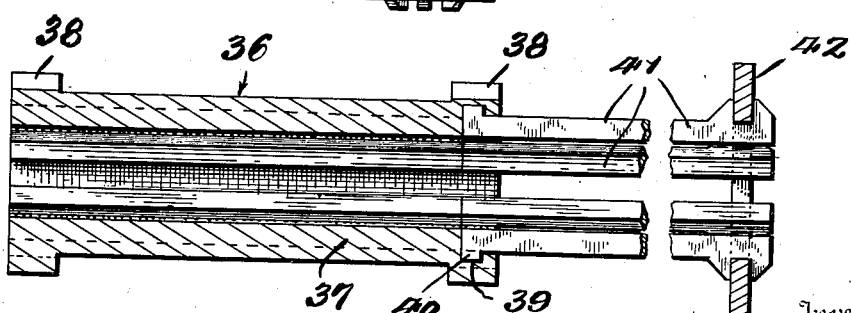
Figure 6 is an enlarged detail of the operating means for effecting reversal of the engine.

One end of the sleeve 37 is provided with an internal annular groove 39 forming a seat for right angular lugs 40 of segmental shafts 41, the latter extending outwardly beyond the closure plate 18 a substantial distance. The outer ends of the shafts 41 are held in position by a clutch collar 42. The segmental shafts 41 are alined with the portions of the sleeve 37 between the slots, as clearly shown in Figure 6, and thus the reverse means may be readily moved longitudinally of the shaft 34. This movement may be accomplished through any suitable lever means connected with the collar 42.

Adjacent the end of the shaft 34 an annular groove 43 is formed and into which there is seated a key 44. The key 44 is in the form of a segment as clearly shown in Figure 8, suitably cut away as at 45, to permit longitudinal movement of the shafts 41 therethrough. The keys 44 abut a shoulder 46, of the shaft and have a right angular portion 47 adapted to lie flush against the outer face of the collar 33. The purpose of this structure permits ready assembly, since the keys 44 may be simply slipped into place in their respective slots, and further, the portion 47 functions in a manner to assist in the adjustment of the rotary members, as will be explained hereinafter.

The opposite end of the shaft 34 is externally threaded, as at 48, to receive a lock nut assembly 49 for securing the shaft in operative position.

The hubs 12 and 13 are closed at one end by a wall integrally formed therewith, the other end of the hubs being closed by a ring plate 51. The hub 12 is externally threaded while the hub 13 is internally threaded, and the ring plate 51 is threadedly engaged therewith. The plate 51 is of substantial thickness to withstand steam pressures within the steam chest, and as shown, abuts the adjacent sleeve 25 of the valve.

A pair of rotary members 52 and 53 are mounted upon the shaft 34, each being positioned inwardly of respective closure plates 18.

The rotary members are identical in construction and a description of one will therefore be made. The rotary member comprises a hub portion 54 having an enlarged annular recess for housing a ball bearing assembly 55, the latter being journalled upon the shaft 34. From the hub 54 the body of the rotary member is extended outwardly as an annular disk upon the rear face of which a circumscribing rib 56 is formed, the rib being positioned adjacent the periphery of the disk. The rib 56 is drilled and tapped at suitable points around its circumference for mounting a beveled driving gear 57, now to be described.

The gear 57 is in the form of a ring having a stepped portion adjacent its inner periphery forming a set for the rib 56. The ring is formed with arcuate slots 58 for registry with the apertures of the rib 56, and bolts 59 engaged through the slots and apertures secure the ring gear to the rotary member. The provision of arcuate slots 58 provides for circumferential adjustment of the gear with respect to the rotary member to compensate for wear and adjustment in assembly, as will be understood as the description proceeds.

Upon the inner face of the rotary member an annular recess 60 is formed, of a diameter substantially equal to that of the outer periphery of the hub 13, and within this recess there is seated a packing means 61. The packing means is shown as embodying a disk having a plurality of annular channels presented in contacting relation with the base of the recess and a packing disk presented toward the steam chest.

The rotary member further comprises an internal gear 62 surrounding the shaft 34, the gear being complemental to a spur gear 38 of the reverse mechanism, as will be described hereinafter.

The inner face of the rotary member 52 or 53 is formed as a bevelled spiral gear generally indicated at 63. The teeth 64 of the gear are arranged in beveled spiral formation extending from the inner periphery outwardly, increasing in width and depth as may be clearly seen in Figures 1 and 2. The bevel of the teeth is such that they snugly contact the walls 16 of the body 11, which is essential, since the spaces between the teeth must confine the working steam. In other words, the spaces are the equivalent to cylinders of reciprocating type of engine.

Within each conical housing 20, a spiral worm pinion 65 is revolubly mounted, the pinion being positioned medially between the rotary members, 52—53, the teeth 66 of the pinion being in meshed engagement with teeth of respective rotary members.

The mounting of the worm pinions 65 will now be dealt with, attention being directed particularly to Figure 1, wherein it will be seen that the plate 22 is provided with a threaded bore 67 for reception of a stud shaft 68. The shaft 68 has a shoulder 69 for support of a ball race 70, the latter revolubly journalling a bevel gear 71. The gear 71 is of a diameter to provide intermeshing engagement with the driving gears 57 of respective rotary members 52—53. The shaft 68 has another shoulder 72 for support of a roller bearing assembly 73, one ring element of the bearing assembly being seated within the pinion 65, this latter bearing affording a combined rotary and thrust support for the pinion.

In order that a drive may be established between the bevel gear 71 and the pinion 65, the contacting surface of the gear and worm are provided with intermeshed teeth as at 74, and through this means a unitary rotation is effected.

The upper end of the worm pinion is concave complemental to the convex portion of the hub 13, and thus it will be seen that support is afforded the pinion 65 both at the top and bottom, providing a very stable support for the pinion.

From the construction of the mounting of the worm pinion, it will be seen that adjustment inwardly or outwardly with respect to the rotary members 52—53 may be accomplished, thereby compensating for wear or for initial adjustment of the parts. A lock nut 75 on the stud shaft 65 is employed for locking the shaft and associated parts in a desired position of adjustment. The stud shaft 68 has a port 76 extending longitudinally thereof and opening within the pinion 65. The outer end of the port 76 is internally threaded for a fitting 76' (see Fig. 7) for supply of lubricant to the bearings and gearing 57 and 71.

In order to prevent an excessive amount of lubricant from entering the teeth of the rotary members 52—53 and the pinions 65, sheet metal guard plates 77 are provided and comprise a right angular flange 78 for diverting lubricant so that it may not have direct passage to the rotary members and the pinions.

The walls 16 comprise an angular wall portion 16' extended substantially at right angles, for a distance from whence it is extended diagonally as at 16—a in the direction of the flange 17, being formed as an integral part thereof. Each of the diagonal walls 16—a is provided with exhaust ports 79 positioned upon opposite sides of the pinions 65, thereby accommodating exhaust steam from the rotary members 52 and 53 into a common exhaust manifold 80. The manifold in the present instance is shown as an annular collar bolted to the walls 16—a by bolts 81, and it will be understood that there will be a manifold for each pinion 65. Each manifold will include a discharge pipe 82 which in turn is in communication with a common discharge pipe 83, the latter preferably increasing in diameter as clearly shown in Figure 7.

Attention is now directed to Figure 2 of the drawings for a more detailed description of the spiral gears 63 and the pinions 65. It has been stated that the teeth 64 increase in width and depth, but in addition, the teeth are of a length greater than the distance from the axial center a of the pinion 65 to the axial center b of the next pinion 65. The length of the teeth will vary according to the number of pinions employed in an engine, but in all events, the teeth must be of such length as to overlap the center of one pinion to a similar point of the next adjacent pinion.

The pinions 65 are of identical construction and a description of one will be sufficient for an understanding of the operation. The pinion 65 (see Fig. 2) is somewhat conically shaped and comprises four separate spiral threads 66, increasing in depth and width from the apex toward the base, the threads having a pitch for snug meshing engagement with the teeth 64 of the members 52 and 63.

The operation will be readily understood from the following description, attention being directed to Figures 1 and 3 of the drawings. Steam is admitted to the steam chest 14 through the pipe 15, the valve 24 being adjusted to admit steam through ports 26 and 27 to the roots of the teeth 66 of respective worm pinions 65, and since the teeth 64 of the rotary members 52 and 53 are meshed with the teeth of the pinions, the steam acts under high pressure upon the teeth, causing rotation of the members 52 and 53 in a clockwise and counterclockwise direction, respectively. Since the pinions 65 are meshed with the driving gears 57, the pinions 65 will be rotated upon their shafts 63. As the pinions 65 rotate, roots of certain of the teeth 66 adjacent their apices will be brought into registry with the ports 26 and 27 for admission of steam therebetween and further rotation of the pinions 65 will bring the next tooth into position to momentarily cut off the steam supply. At such time steam will be trapped between the roots of teeth 66 of the pistons 65 and teeth 64 of the rotary member 52—53, as well as the walls of the casing, forming the first stage, during which the steam is expanding, forcing the rotary members and pinions to rotate, and, as the rotary members move, the trapped steam is allowed to continue its expansion due to the increased depth and width of the roots of teeth. The steam finally passes into the exhaust manifold 80, but this does not occur until after the teeth have passed to a point beyond the medial axis of the next adjacent pinion 65, forming the second stage of expansion.

It will be apparent that the above takes place at the same time with each of the pinions and since these are equally spaced about the rotary members an even torque is given to the rotary members. It will be further noted that by having the teeth 64 of a length more than the distance from the axial center of one pinion to that of the next adjacent pinion full advantage of expanding steam is obtained.

It should be noted that live steam is being continually admitted to the chest 14 and that control of the steam to the pinions 65 and rotary members 52—53 is entirely through adjustment of the sleeve valves 25, and by the arrangement of ports 26 each of the pinions 65 will be supplied with like quantities of steam, thereby providing a supply means which effects control of speed from a very low one to full capacity, and this with an even torque.

When it is desired to reverse the rotation of the shaft 34, assuming that the parts are in the position shown in Figure 1, it is only necessary to shift the mechanism 36 so that the gear 38 at the opposite end of the sleeve 37 engages the internal gear 62 of the member 52, which operation releases the member 53 so as to rotate freely, or in other words, there is no positive drive with the shaft 34.

When and if wear occurs between the rotary members 52—53 and the pinions 65, or between the members 52—53 and the walls 16, such wear may be compensated for by merely loosening the lock nut assembly 49 and then tightening the innermost nut. This obviously draws the shaft longitudinally toward the nut, since the shoulders 47 of the keys 44 force the roller cage 33 against the roller assembly 55 with consequent inward movement of the rotary member 53 toward the worm pinions 65 and the walls 16. The tightening of the nut of the lock assembly likewise moves the roller cage next adjacent thereto against the ball race assembly 55 with resultant movement of the rotary member 52 toward the pinions 65 and the walls 16. After adjustment the outer nut of the assembly 49 is actuated to secure the adjustment.

By the construction shown and described it will be apparent that the casing body is under a compressive force rather than stress, since it is positioned between the rotary members 52—53, whereby the casing may be constructed from relatively light steel or cast iron, or other suitable metal.

While I have shown and described a preferred form of the invention, and have recited a construction in more or less detail, this was done solely for an understanding of the invention, and I consider as my own all such modifications in structure as fairly fall within the scope of the appended claims.

I claim:

1. A rotary steam engine comprising a housing, a pair of rotary members revolubly mounted therein, each member having helical bevel threads on one face thereof, the rotary members being arranged in opposed relation to one another, pinions revolubly mounted in the casing, the threads of the pinions being in meshed engagement with threads of the rotary members, drive means between the rotary members and respective pinions, steam inlet means between respective pinions and the rotary members, and exhaust ports in the casing outwardly of the periphery of the rotary members.

2. A rotary steam engine comprising a housing, a pair of rotary members revolubly mounted therein, each member having helical bevel threads on one face thereof, the rotary members being arranged in opposed relation to one another, pinions revolubly mounted in the casing, the threads of the pinions being in meshed engagement with threads of the rotary members, drive means between the rotary members and respective pinions, steam inlet means between respective pinions and the rotary members, valve means for simultaneously controlling the inlet of steam to the various rotary members and pinions, and exhaust ports in the casing outwardly of the periphery of the rotary members.

3. A rotary steam engine comprising a housing having a hub and end closure plates, conical shaped chambers formed in the housing extending outwardly from the hub, said chambers being spaced circumferentially of the housing, the walls of the housing between the chambers being inclined in opposite directions, a shaft revolubly mounted in the closure plates, a pair of rotary members revolubly journalled on the shaft and positioned on opposite sides of the housing, said rotary members each having bevelled spiral threads, the threads being complemental to the inclined walls of the casing, a conically shaped pinion revolubly mounted in each chamber, each pinion having a plurality of threads for meshing engagement with threads of respective rotary members, drive means between the rotary members and the pinions, steam inlet means through the hub, steam inlet ports through the hub and in communication with threads of the rotary members and pinions, and rotary valve means within the hub for simultaneously controlling passage of steam through the last named ports.

4. A rotary steam engine comprising a casing having a pair of concentric hubs, connected at one end, conically shaped chambers integrally formed with the outer hub and spaced circumferentially therearound, the apices of the chambers being presented toward the hub, the walls of the casing connecting the chambers being outwardly inclined and presenting a conical surface, a substantially right angular wall extended outwardly from said conical surface and thence obliquely to define an inclined wall, said wall terminating in an annular flange, a closure plate for each conical housing, end closure plates complemental to the annular flanges, a shaft revolubly mounted in the end closure plate, a pair of rotary members revolubly mounted on the shaft, a rotary member being positioned between respective end closure plates and respective ends of the hub, said rotary members each having helical bevelled threads in bearing contact with the conical surfaces of the walls, a conical shaped pinion revolubly mounted in each conical chamber, said pinions having a plurality of spiral threads for intermeshing engagement with threads of said rotary members, drive means between the rotary members and the pinions; closure means for the other end of the hubs defining a closed chamber, a steam inlet opening upon the chamber, steam inlet ports opening through the hub and communicating with the teeth of the rotary members and the pinions, valve means within the hub for simultaneous control of steam through the last named inlet ports, and exhaust ports formed in the inclined portions of the walls.

5. A rotary steam engine comprising a casing having a pair of concentric hubs connected at one end, conically shaped chambers integrally formed with the outer hub and spaced circumferentially therearound, the apices of the chambers being presented toward the hub, the walls of the casing connecting the chambers being outwardly inclined and presenting a conical surface, a substantially right angular wall extended outwardly from said conical surface and thence obliquely to define an inclined wall, said wall terminating in an annular flange, a closure plate for each conical housing, end closure plates complemental to the annular flanges, a shaft revolubly mounted in the end closure plates, a pair of rotary members revolubly mounted on the shaft, a rotary member being positioned between respective end closure plates and respective ends of the hub, said rotary members each having helical bevelled threads in bearing contact with the conical surfaces of the walls, a conical shaped pinion revolubly mounted in each conical chamber, said pinions having a plurality of spiral threads for intermeshing engagement with threads of said rotary members, a gear fixed to each rotary member, a gear on each pinion in mesh with respective first named gears, closure means for the other end of the hubs defining a closed chamber, a steam inlet opening upon the chamber, steam inlet ports opening through the hub and communicating with the teeth of the rotary members and the pinions, valve means within the hub for simultaneous control of steam through the last named inlet ports, exhaust ports formed in the inclined portions of the walls, and an exhaust manifold connected with the exhaust ports associated with each pinion.

6. A rotary steam engine comprising a housing, a pair of rotary members revolubly mounted therein, each member having helical bevel threads on one face thereof, the rotary members being arranged in opposed relation to one another, pinions revolubly mounted in the casing, the threads of the pinions being in meshed engagement with threads of the rotary members, the threads of the rotary member being of a length greater than the distance from the medial axis of one pinion to the medial axis of the next adjacent pinion, drive means between the rotary members and respective pinions, steam inlet means between respective pinions and the rotary members, valve means for simultaneously controlling the inlet of steam to the rotary members and pinions, and exhaust ports in the casing outwardly of the periphery of the rotary members.

7. A rotary steam engine comprising a casing having a pair of concentric hubs connected at one end, conically shaped chambers integrally formed with the outer hub and spaced circumferentially therearound, the apices of the chambers being presented toward the hub, the walls of the casing connecting the chambers being outwardly inclined and presenting a conical surface, a substantially right angular wall extended outwardly from said conical surface and thence obliquely to define an inclined wall, said wall terminating in an annular flange, a closure plate for each conical housing, end closure plates complemental to the annular flanges, a shaft revolubly mounted in the end closure plate and extended through the inner hub, roller bearings on the shaft adjacent the end closure plates, rotary members journalled on the bearings, said rotary members each having helical bevelled threads in bearing contact with the conical surfaces of the walls, a conical shaped pinion in each conical chamber, a stud shaft adjustably mounted in the plates of each chamber, each stud shaft having a roller bearing for support of the pinion, a bevel gear revolubly supported upon each stud shaft, said gear being connected to the pinion for rotation therewith, each of said pinions having a plurality of spiral threads for intermeshing engagement with threads of said rotary members, the thread of the rotary members being of a length greater than the distance from the medial axis of one pinion to the medial axis of the next adjacent pinion, closure means for the other end of the hubs defining a closed chamber, a steam inlet opening upon the chamber, packing means between the ends of the chamber and the rotary members, steam inlet ports opening through the hub and communicating with the teeth of the rotary members and the pinions, valve means within the chamber for simultaneous control of steam through the last named inlet ports, exhaust ports formed in the inclined portions of the walls, an exhaust manifold for the exhaust ports, and a bevelled gear fixed to each of the rotary members in meshed engagement with the bevelled gears of the pinions.

8. The structure of claim 7 in which the last named bevelled gears each include a plurality of arcuate slots, a bolt extended through each slot and threadedly engaged in apertures of the rotary members, whereby to permit circumferential adjustment of the bevel gears with respect to the rotary member.

9. A rotary steam engine comprising a casing having a pair of concentric hubs connected at one end, conically shaped chambers integrally formed with the outer hub and spaced circumferentially therearound, the apices of the chambers being presented toward the hub, the walls of the casing connecting the chambers being outwardly inclined and presenting a conical surface, a substantially right angular wall extended outwardly from said conical surface and thence obliquely to define an inclined wall, said wall terminating in an annular flange, a closure plate for each conical housing, end closure plates complemental to the annular flanges, a shaft revolubly in the end closure plate and extended through the inner hub, roller bearings on the shaft adjacent the end closure plates, rotary members journalled on the bearings, said rotary members each having helical bevelled threads in bearing contact with the conical surfaces of the walls, a conical shaped pinion in each conical chamber, a stud shaft adjustably mounted in the plate of each chamber, each stud shaft having a roller bearing for support of the pinion, a bevel gear revolubly supported upon each stud shaft, said gear being connected to the pinion for rotation therewith, each of said pinions having a plurality of spiral threads for intermeshing engagement with threads of said rotary members, the threads of the rotary members being of a length greater than the distance from the medial axis of one pinion to the medial axis of the next adjacent pinion, closure means for the other end of the hubs defining a closed chamber, a steam inlet opening upon the chamber, packing means between the ends of the chamber and the rotary members, steam inlet ports opening through the hub and communicating with the teeth of the rotary members and the pinions, valve means within the chamber for simultaneous control of steam through the last named inlet ports, exhaust ports formed in the inclined portions of the walls, an exhaust manifold for the exhaust ports, a bevelled gear fixed to each of the rotary members in meshed engagement with the bevelled gears of the pinions, said rotary members having an internal gear arranged in opposed relation, clutch means connected to the shaft and shiftable for selective engagement with one of the last named gears, whereby to reverse the direction of rotation of the shaft.

10. A rotary steam engine comprising a casing having a pair of concentric hubs connected at one end, conically shaped chambers integrally formed with the outer hub and spaced circumferentially therearound, the apices of the chambers being presented toward the hub, the walls of the casing connecting the chambers being outwardly inclined and presenting a conical surface, a substantially right angular wall extended outwardly from said conical surface and thence obliquely to define an inclined wall, said wall terminating in an annular flange, a closure plate for each conical housing, end closure plates complemental to the annular flanges, a shaft revolubly mounted in the end closure plate and extended through the inner hub, roller bearings on the shaft adjacent the end closure plates, rotary members journalled on the bearings, said rotary members each having helical bevelled threads in bearing contact with the conical surfaces of the walls, a conical shaped pinion in each conical chamber, a stud shaft adjustably mounted in the plate of each chamber, each stud shaft having a roller bearing for support of the pinion, a bevel gear revolubly supported upon each stud shaft, said gear being connected to the pinion for rotation therewith, each of said pinions having a plurality of spiral threads for intermeshing engagement with threads of said rotary members, the threads of the rotary members being of a length greater than the distance from the medial axis of one pinion to the medial axis of the next adjacent pinion, closure means for the other end of the hubs defining a closed chamber, a steam inlet opening upon the chamber, packing means between the ends of the chamber and the rotary members, steam inlet ports opening through the hubs and communicating with the teeth of the rotary members and the pinions, valve means within the chamber for simultaneous control of steam through the last named inlet ports, exhaust ports formed in the inclined portions of the walls, an exhaust manifold for the exhaust ports, a bevelled gear fixed to each of the rotary members in meshed engagement with the bevelled gears of the pinions, each rotary member having an internal gear arranged in opposed relation to one another, longitudinally extended splines on the shaft, a sleeve slidable on the shaft and having grooves complemental to the splines, a pair of gears on the sleeve positioned for selective engagement with the internal gears of the rotary members, and means exteriorly of the casing for shifting the sleeve.

11. The structure of claim 10 in which said shifting means comprises a plurality of shafts slidably mounted within grooves of the first shaft and operating means for the shafts, externally of the casing.

12. A rotary steam engine comprising a housing, a pair of rotary members revolubly mounted therein, each member having helical bevel threads on one face thereof, the rotary members being arranged in opposed relation to one another, pinions revolubly mounted in the casing, the threads of the pinions being in meshed engagement with threads of the rotary members, the threads of the rotary members being of a length greater than the distance from the medial axis of one pinion to the medial axis of the next adjacent pinion, the roots of the teeth increasing in depth and width in the direction of the periphery of the rotary members, drive means between the rotary members and respective pinions, steam inlet means between respective pinions and the rotary members, valve means for simultaneously controlling the inlet of steam to the rotary members and pinions, and exhaust ports in the casing outwardly of the periphery of the rotary members.

13. The structure of claim 10 in which the shaft is longitudinally adjustable to effect movement of the rotary members toward respective pinions and the adjacent surfaces of the walls of the casing.

14. A rotary steam engine comprising a casing having a pair of concentric hubs connected at one end, conically shaped chambers integrally formed with the outer hub and spaced circumferentially therearound, the apices of the chambers being presented toward the hub, the walls of the casing connecting the chambers being outwardly inclined and presenting a conical surface, a substantially right angular wall extended outwardly from said conical surface and thence obliquely to define an inclined wall, said wall at a tangent thereto and terminating in an annular flange, a closure plate for each conical chamber, end closure plates complemental to the annular flanges, said closure plates having a hub, a collar mounted in each hub, a shaft revolubly mounted in the collars, said shaft having means at one end exteriorly of the casing in bearing contact with the collar, roller bearings on the shaft in abutting relation to the collars, rotary members journalled on the bearings, said rotary members each having helical bevelled threads in bearing engagement with the conical surfaces of the walls, a conical shaped pinion in each conical chamber, a stud shaft adjustably mounted in the plates of each chamber, each stud shaft having a roller bearing for support of the pinion, a bevel gear revolubly supported upon each stud shaft, said gear being connected to the pinion for rotation therewith, each of said pinions having a plurality of spiral threads for intermeshing engagement with threads of said rotary members, the threads of the rotary members being of a length greater than the distance from the medial axis of one pinion to the medial axis of the next adjacent pinion, the roots of the teeth increasing in depth and width in the direction of the outer periphery of the rotary members, closure means for the other end of the hubs defining a closed chamber, a steam inlet opening upon the chamber, packing means between the ends of the chamber and the rotary members, steam inlet ports opening through the hub and communicating with the teeth of the rotary members and the pinions, valve means within the chamber for simultaneous control of steam through the last named ports, exhaust ports formed in the inclined portions of the walls, an exhaust manifold for the exhaust ports, a bevelled gear fixed to each rotary member in meshed engagement with the bevelled gears of the pinions, an internal gear on each rotary member arranged in opposed relation to each other, splines on the shaft, a sleeve slidably mounted on the shaft and having grooves complemental to the splines, a pair of gears on the sleeve, the gears being positioned for selective engagement with respective internal gears, means exterior of the casing for shifting the sleeve, said shaft having a threaded portion and an adjusting and lock nut on the threaded portion in bearing contact with the next adjacent collar.

FELIX HOLZKNECHT.